US009688305B2

(12) United States Patent
Bartolozzi et al.

(10) Patent No.: US 9,688,305 B2
(45) Date of Patent: Jun. 27, 2017

(54) TILTABLE MOTORCYCLES WITH TWO FRONT STEERING WHEELS

(71) Applicant: PIAGGIO & C. S.p.A., Pontedera, PISA (IT)

(72) Inventors: Stefano Bartolozzi, Florence (IT); Luca Bernardi, Calcinaia (IT); Marco Profeti, La Rotta (IT); Walter Rosellini, Montecatini Terme (IT)

(73) Assignee: PIAGGIO & C. S.P.A., Pontedera, Pisa (IT)

( * ) Notice: Subject to any disclaimer, the term of this patent is extended or adjusted under 35 U.S.C. 154(b) by 23 days.

(21) Appl. No.: 14/301,377

(22) Filed: Jun. 11, 2014

(65) Prior Publication Data

US 2014/0353940 A1   Dec. 4, 2014

Related U.S. Application Data

(63) Continuation of application No. 13/810,231, filed as application No. PCT/IB2011/001619 on Jul. 7, 2011.

(30) Foreign Application Priority Data

Jul. 16, 2010   (IT) .............................. MI2010A1317

(51) Int. Cl.
   *B62D 9/02*   (2006.01)
   *B60G 3/01*   (2006.01)
   (Continued)

(52) U.S. Cl.
   CPC ................ *B62D 9/02* (2013.01); *B60G 3/01* (2013.01); *B62D 9/04* (2013.01); *B62D 61/065* (2013.01);
   (Continued)

(58) Field of Classification Search
   CPC .......... B62D 9/02; B62D 9/04; B62D 61/065; B62K 5/05; B62K 5/08; B62K 5/10;
   (Continued)

(56) References Cited

U.S. PATENT DOCUMENTS 2,953,395 A * 9/1960 Turner ................... B60G 15/06
                                                        267/221
4,179,135 A   12/1979 Slater
(Continued)

FOREIGN PATENT DOCUMENTS

DE        808191      7/1951
DE      1063473 B    8/1959
(Continued)

*Primary Examiner* — Joseph Rocca
*Assistant Examiner* — Felicia L Brittman
(74) *Attorney, Agent, or Firm* — Robert E. Alderson, Jr.

(57) ABSTRACT

Motorcycles are provided which include a frame, two front steering wheels, a steering pipe rotatably connected to the frame and rigidly connected to two supporting assemblies, one for each front steering wheel and a steering group consisting of two pairs of transversal arms—upper front, lower front, upper rear and lower rear—arranged inverted at the opposite sides of a central steering pipe and laterally connected through two lateral posts. On each of the supporting assemblies the fixed portions of two telescopic elements may be constrained. Each pair of telescopic elements may be cantilever-mounted with respect to the steering wheel.

17 Claims, 11 Drawing Sheets (51) Int. Cl.
    *B62K 5/027*     (2013.01)
    *B62K 5/05*     (2013.01)
    *B62K 5/08*     (2006.01)
    *B62K 5/10*     (2013.01)
    *B62K 11/02*     (2006.01)
    *B62D 9/04*     (2006.01)
    *B62D 61/06*     (2006.01)
    *B62K 25/08*     (2006.01)
    *B62K 5/01*     (2013.01)
    *B62K 5/00*     (2013.01)
    *B62K 25/04*     (2006.01)

(52) U.S. Cl.
    CPC ................ *B62K 5/01* (2013.01); *B62K 5/027* (2013.01); *B62K 5/05* (2013.01); *B62K 5/08* (2013.01); *B62K 5/10* (2013.01); *B62K 11/02* (2013.01); *B62K 25/08* (2013.01); *B60G 2300/122* (2013.01); *B60G 2300/45* (2013.01); *B62K 2005/001* (2013.01); *B62K 2025/047* (2013.01)

(58) Field of Classification Search
    CPC .. B62K 5/027; B62K 11/02; B62K 2005/001; B62K 2025/047; B60G 3/01; B60G 2300/122; B60G 2300/45

USPC ........................................................ 280/269
    See application file for complete search history.

(56) References Cited

U.S. PATENT DOCUMENTS

| | | | |
|---|---|---|---|
| 4,351,410 | A | 9/1982 | Townsend |
| 4,634,137 | A | 1/1987 | Cocksedge |
| 4,740,004 | A | 4/1988 | McMullen |
| 7,264,251 | B2 * | 9/2007 | Marcacci ........... B60G 17/0152 |
| | | | 280/124.103 |

FOREIGN PATENT DOCUMENTS

| | | |
|---|---|---|
| DE | 2707562 C2 | 9/1977 |
| DE | 29814357 U1 | 11/1998 |
| EP | 1090832 A1 | 4/2001 |
| EP | 1391374 A1 | 2/2004 |
| EP | 1561612 A1 | 8/2005 |
| EP | 1666346 A1 | 6/2006 |
| EP | 1918187 A1 | 5/2008 |
| FR | 2085428 A1 | 12/1971 |
| FR | 2940242 A1 | 6/2010 |
| FR | 2953184 A1 | 6/2011 |
| JP | H01229787 A | 9/1989 |
| WO | 2005051754 A1 | 6/2005 |
| WO | 2011096571 A1 | 2/2011 |

* cited by examiner

TILTABLE MOTORCYCLES WITH TWO FRONT STEERING WHEELS

CROSS-REFERENCE TO RELATED APPLICATION

This application is a continuation application of U.S. application Ser. No. 13/810,231 filed Jan. 15, 2013 which is a 35 U.S.C. §371 National Phase Entry Application from PCT/IB2011/001619, filed Jul. 7, 2011, claiming priority to Italian Patent Application No. MI2010A001317, filed Jul. 16, 2010, which are hereby incorporated by reference in their entirety.

FIELD OF THE INVENTION

The present invention refers to a steering suspension system with cantilevered wheel, suitable for being mounted on the non-driving (idle) front axles of motorcycles in general, in particular three or fourwheeled tilting motorcycles.

BACKGROUND OF THE INVENTION

In the past different suspension solutions for motorcycles have been developed that are provided with a single longitudinal arm, of the "push" or "pull" type, and with a damper with coaxial spring. In most of such so-called "single-arm" solutions, at least as regards applications on scooters or on tilting vehicles in general, the steering system is made by simply constraining the support pipe of the suspension arm to the frame, using bearings and/or fifth wheels.

A typical example of application of the pushing arm system is found on the "Vespa" scooter, whereas the pulling arm system is mounted for example on the "P3" tilting three-wheeled scooter produced by Piaggio. The pushing arm system is made up of a single rigid arm, on the lower end of which a small arm is articulated, ending on the pin of the front wheel. Such a small arm has the lower end of the suspension fixed onto it, which in turn fixes on top also to the rigid arm. The assembly thus takes up the shape of a parallelogram. The pulling arm system constitutes a variant of the pushing arm system.

The characteristics and the advantages of this kind of single-arm suspension for motorcycles can be summarized as follows:

possibility of quickly replacing the wheel, since the connection of the wheel itself to the hub is easy to access;

smooth running, ensured by the movement of the support arm of the wheel on bearings and by the absence of transversal loads on the damper;

possibility of obtaining different behavior of the suspension during braking, according to the positioning of the centre of the wheel as regards the pivot of the arm and the type of attachment of the brake clip to the suspension.

However, the aforementioned advantages are counterbalanced by a series of defects that make single-arm suspensions unsuitable for some specific applications. The requirements of rigidity and low bulk, indeed, significantly limit the length of the arm of the suspension in relation to a correct operation of the system. Consequently, the stroke available to absorb the unevenness of the road is equally limited. For the same reasons it is complex to use wheels with a large diameter associated with such a type of suspension.

The circular trajectory of the suspension arm and the type of steering system (steering axle fixed as regards the frame) also mean that the "caster trail" of the wheel as regards the steering axle itself varies depending n the stroke of the suspension and cannot be controlled precisely. As known, by caster trail, or "front wheel trail", of a motorcycle we mean the distance between the projection to the ground of the perpendicular passing through the pin of the front wheel or, in other words, the point of contact of the front wheel and the ground, and the point of intersection of the rotation axis of the steering again with the ground. The aforementioned variation of the caster trail can, in some cases, cause sudden reactions of the steering for long strokes of the suspension, as occurs for example in braking manoeuvres.

Moreover, the large number of components of the single-arm system complicates the assembly steps of the assembly and involves higher costs than a conventional fork suspension.

In the case of use of a single-arm suspension on the front end of tilting vehicles in general, like for example the "MP3" tilting three-wheeled scooter produced by Piaggio, it is finally necessary to foresee connection elements to the frame having high rigidity values, as well as suitable linkages for all driving conditions, capable for example of carrying out the asymmetric blocking of the wheels during braking. The suspension system must therefore ensure high precision and ease of assembly, as well as suitably limiting the excursions of the components depending on the spaces available following complex combined rolling and steering movements.

Therefore, suspension systems for motorcycles have been made provided with a double arm cantilever-mounted as regards the wheel, like for example those described in documents U.S. Pat. No. 2,953,395 and DE 808191 C. Such suspension systems, however, do not appear to be able to be advantageously applied on a tilting three or four-wheeled motorcycle. Document WO 2005/051754 A1, on the other hand, describes a suspension system for motorcycles provided with a double arm mounted on each side of the wheel. Finally, document FR 2940242 A1 describes a classical single-arm suspension system for a motorcycle.

SUMMARY OF THE INVENTION

The purpose of the present invention is therefore to make a steering suspension system with cantilevered wheel for motorcycles that is able to overcome the aforementioned drawbacks of the prior art in an extremely simple, cost-effective and particularly functional manner.

In detail, a purpose of the present invention is to make a steering suspension system with cantilevered wheel for motorcycles that makes it possible to have a constant caster trail for the entire stroke of the suspension.

Another purpose of the invention is to make a steering suspension system with cantilevered wheel for motorcycles that allows long strokes of the suspension itself, as well as allowing wheels of any diameter to be mounted.

A further purpose of the invention is to make a steering suspension system with cantilevered wheel for motorcycles that keeps the transversal bulks very low and that offers the possibility of quickly replacing the wheel.

Yet another purpose of the invention is to make a steering suspension system with cantilevered wheel for motorcycles that has a small number of components and that thus allows simple assembly, with low costs.

An additional purpose of the invention is to make a convenient connection system of the steering suspension with cantilevered wheel to the frame of a tilting vehicle with two front steering wheels that ensures:

high rigidity,
easy and precise assembly,
correct driving dynamics in blocked conditions of a single wheel during braking, suitable steering limitations depending on the rolling angle of the vehicle.

These purposes according to the present invention are accomplished by making a motorcycle provided with a steering suspension system with cantilevered wheel, in particular a tilting three or four-wheeled motorcycle, as described herein. The characteristics and advantages of a steering suspension system with cantilevered wheel for motorcycles according to the present invention will become clearer from the following description and reference to the appended drawings briefly described below.

DETAILED DESCRIPTION

With reference to the figures, a steering suspension system with cantilevered wheel for motorcycles according to the invention is shown, wholly indicated with reference numeral 10. The suspension system 10 is configured to be applied to one or more front steering wheels 12 of a generic motorcycle 100, like for example a scooter or else a so-called "hybrid" motorcycle. By "hybrid" motorcycle we mean a particular kind of tilting three or four-wheeled motorcycle equipped with two front steering wheels, which can be driven like a motorcycle, being able to tilt laterally during cornering, but that at the same time offers the usual stability of automobiles.

The suspension system 10 firstly comprises a steering pipe 14, rotatably connected to the frame 102 of the motorcycle 100 through bearings to make the steering of the wheels 12 and of the suspension system 10 itself. The steering pipe 14 is rigidly connected to a support assembly 16 on which two clamps 18 and 20 are obtained that clamp the fixed portions or rods of two telescopic elements 22 and 24. Such telescopic elements 22 and 24 foresee the presence, inside them, of respective elastic elements 58 and oscillation damping elements 60 as occurs for conventional motorcycle forks.

More specifically, the suspension system 10 comprises a pair of telescopic elements 22 and 24 cantilever-mounted, in other words laterally, as regards each wheel 12. The sliding portions, or legs, of such telescopic elements 22 and 24 are constrained parallel to one another so as to make both telescopic elements 22 and 24 lie on a plane parallel to the plane of each wheel 12. Each telescopic element 22 and 24 is also provided with an elastic element 58 (for example a coil spring), arranged inside the respective fixed portion or rod, and an oscillation damping element 60 (for example a hydraulic damper), arranged inside the respective sliding portion or leg, so as to make the suspension of the motorcycle 100.

On the sliding portions or legs of the telescopic elements 22 and 24 all of the supports for the connection of the other components of the suspension system 10 are thus obtained. In particular, on the leg of a first telescopic element 22 one or more holes 26A, 26B and 26C are obtained that couple with corresponding holes 26A, 26B and 26C obtained on the leg of the second telescopic element 24, so as to obtain the mutual connection, through special fixing means that will be described in greater detail hereafter, of such telescopic elements 22 and 24.

On the legs of the first telescopic element 22 and/or of the second telescopic element 24 it is thus possible to obtain a sleeve 28 for supporting the pin 30 of the wheel 12, one or more housings 32 for supporting the brake clip 34 and one or more housings 36 for fixing the mudguard 38 of such a wheel 12. The pin 30 of the wheel 12 also has the assembly consisting of rim and tyre or, in other words, the wheel 12 itself on which a brake disk 40 is fitted, connected to it, through rolling bearings and in a per se known way.

Figure 2:
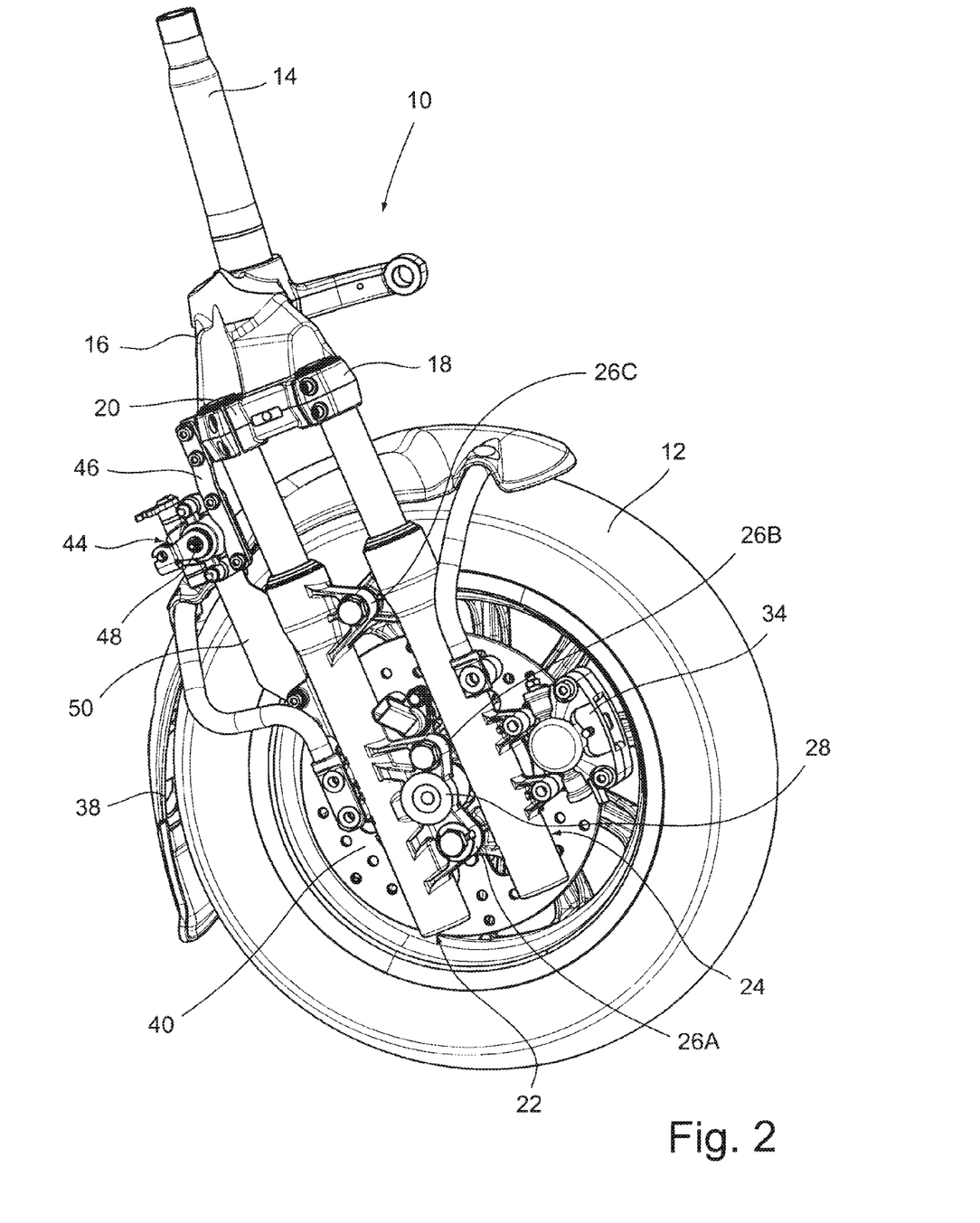
FIG. 2 is a perspective view of a first example embodiment of the suspension system according to the invention, applied to the front steering wheel of a generic motorcycle, in which the wheel itself, the brake assembly, a suspension blocking system and the mudguard are highlighted.
Figure 3:
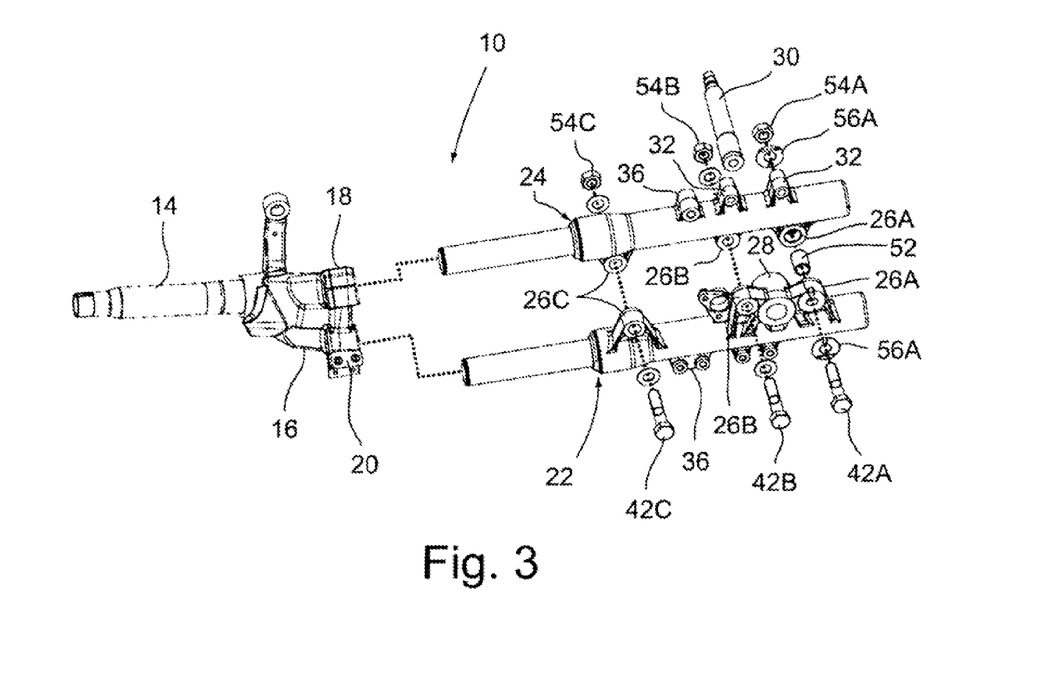
FIG. 3 is an exploded view of just the components of the suspension system according to the invention, with the relative connection elements.
Figure 4:
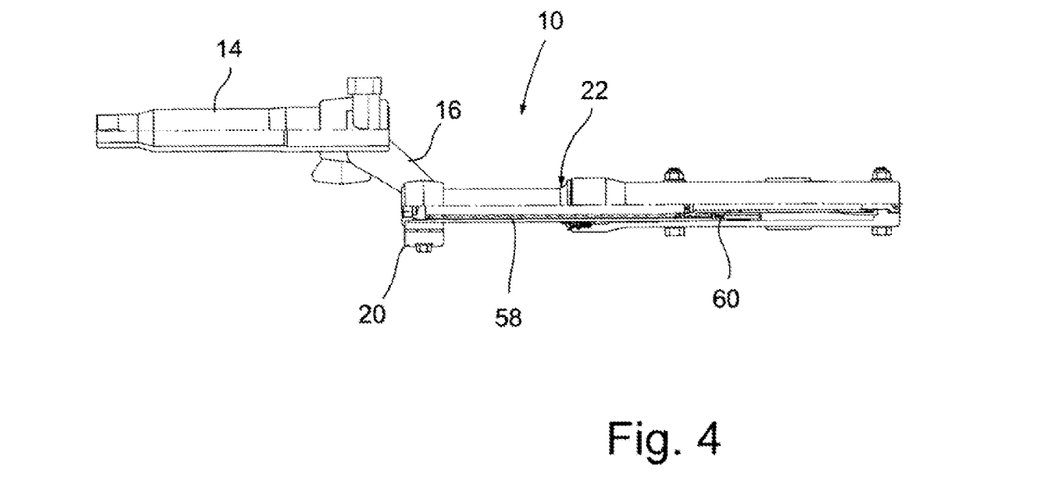
FIG. 4 is a section view showing the internal components (elastic element and damping element) of the suspension system according to the invention.

In terms of the functionality of the suspension system 10 according to the invention, based on the first example embodiment shown in FIGS. 2 to 4, the connection between the two telescopic elements 22 and 24, carried out in a rigid manner through the connection holes 26A, 26B and 26C and the relative screws 42A, 42B and 42C, prevents the relative rotation of the sliding portions (legs) of such telescopic elements 22 and 24 around their own axis and, therefore, defines univocally the steering angle of the wheel assembly 12 as regards the frame 102 of the motorcycle 100 depending on the rotation imparted by the driver to the steering pipe 14. For this reason it is possible to use common legs and motorcycle fork rods with circular section to make the two telescopic elements 22 and 24.

The number of connection and fastening means between the two telescopic elements 22 and 24 can vary according to requirements in terms of flexing rigidity of the suspension system 10. For example, FIG. 3 shows three distinct pairs of connection holes 26A, 26B and 26C with relative screws 42A, 42B and 42C, where the pair of upper connection holes 26C has been made on the top of the sliding legs of the telescopic elements 22 and 24 to improve the distribution of loads between the telescopic elements 22 and 24 themselves and, therefore, to decrease the overall deformations of the suspension system 10.

Figure 5:
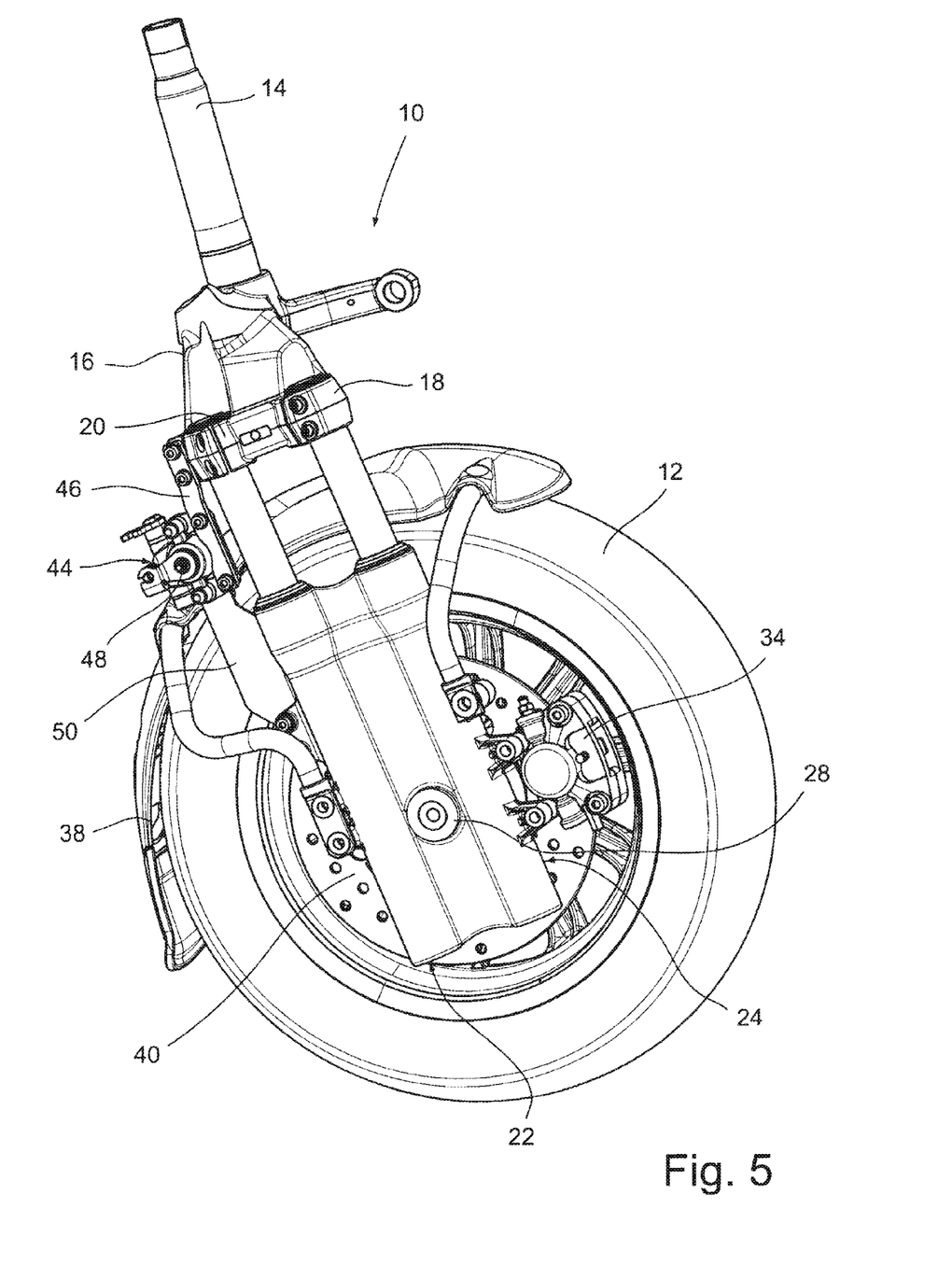
FIG. 5 is a perspective view of a second example embodiment of the suspension system according to the invention, applied to the front steering wheel of a generic motorcycle, in which the wheel itself, the brake assembly, a suspension blocking system and the mudguard are once again highlighted.

As an alternative solution to the connection means described above between the two telescopic elements 22 and 24, with reference to the second example embodiment of FIG. 5, in order to further increase the rigidity of the suspension system 10 it is possible to foresee for the sliding legs of such telescopic elements 22 and 24 be manufactured in one piece, in other words integrated in a single element. On this single element it is thus possible to obtain the two cylindrical housings for the telescopic coupling with the two fixed portions or rods, made as described above, of the telescopic elements 22 and 24 themselves.

In brief, the suspension system 10 according to the invention allows the movement of the wheel assembly 12 according to a rectilinear direction defined by the axes of the telescopic elements 22 and 24, which must necessarily be parallel to one another to ensure the correct operation of the suspension system 10 itself. Such rectilinear movement ensures that the caster trail of the wheel 12 as regards the axis defined by the steering pipe 14 can be kept constant, at least in the case in which such an axis defined by the steering pipe 14 is parallel to the axes of the telescopic elements 22 and 24. The suspension system 10 according to the invention in any case makes it possible to replicate the kinematic conditions commonly obtained with conventional motorcycle forks, both by optionally inclining the steering pipe 14 in a different way with respect to the direction of the axes of the telescopic elements 22 and 24, and by introducing a longitudinal offset of the pin 30 of the wheel 12 as regards the axis defined by the steering pipe 14.

Figure 1A:
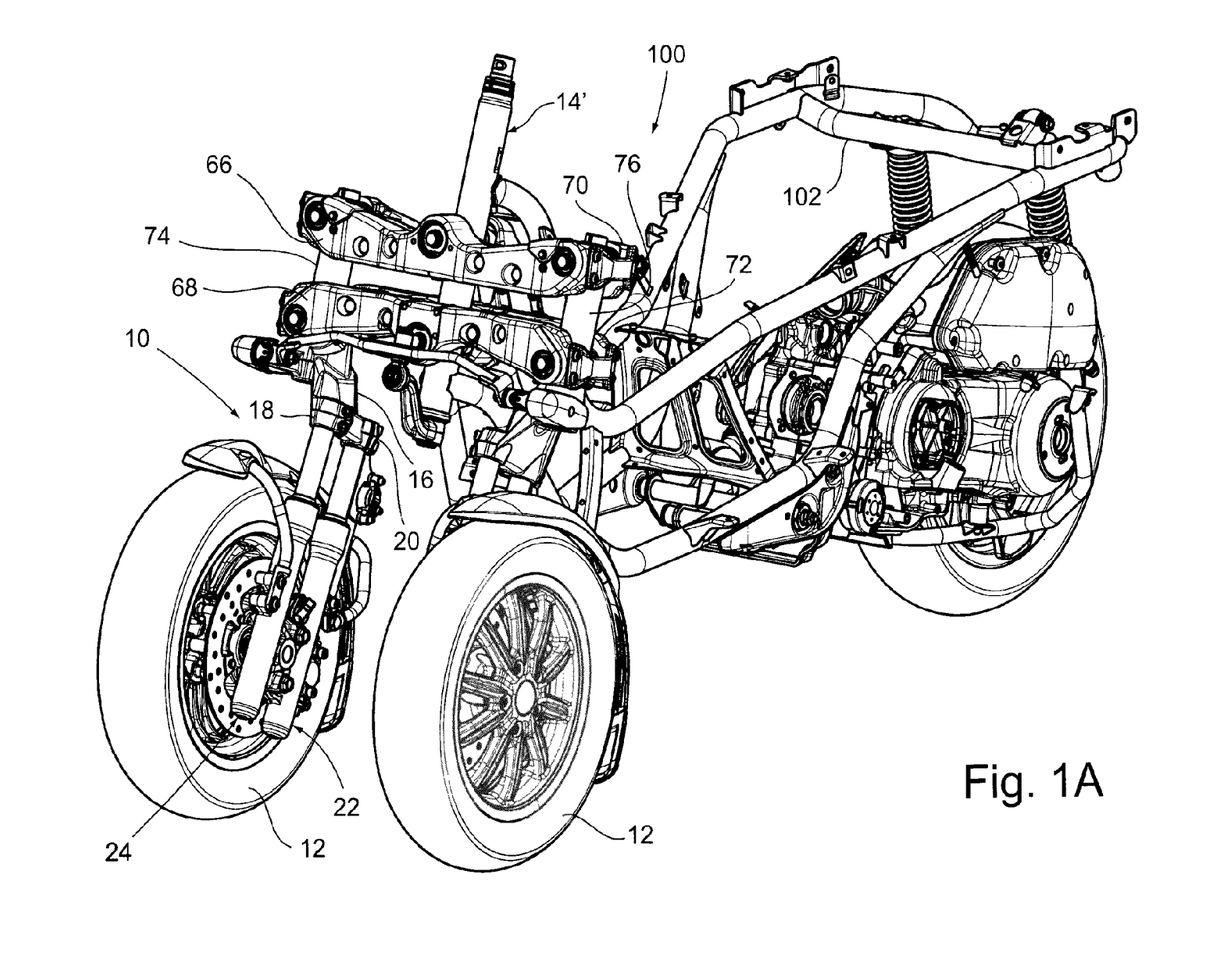
FIG. 1A is a perspective view showing the frame and the engine unit of a tilting three-wheeled motorcycle, illustrated in vertical position, to which a suspension system according to the invention is applied.

The suspension system 10 according to the invention also makes it possible to significantly reduce the transversal bulk of the front suspension of the motorcycle 100, given that the components of the front suspension itself are all arranged on the same side of the wheel 12 and, observing the motorcycle 100 from the front, they do not exceed the bulk of a single arm of a conventional fork. Thanks to such a characteristic, moreover, the replacement of the front wheel 12 is extremely easy, since it can be handled as commonly occurs on an automobile. These last two characteristics are of particular interest for use of the suspension system 10 according to the invention on tilting three or four-wheeled motorcycles, like for example the motorcycle 100 of FIG. 1, in which the requirements of bulk and practicality are even more relevant than on a conventional two-wheeled motorcycle.

Again with reference to installation on tilting three or four-wheeled motorcycles, another special feature of the suspension system 10 according to the invention concerns the possibility of foreseeing, thanks to the low bulk of the suspension system 10 itself and the rectilinear trajectory of all of the respective elements in relative movement, a blocking system 44 of the rectilinear movement of the wheel 12 as regards the steering pipe 14 or, in other words, of the leg of each telescopic element 22 and 24 as regards the relative rod. The blocking system 44 comprises a connection plate 46, constrained to the support assembly 16, on which a calliper 48, of the mechanical or hydraulic type, is installed, which acts on a plate 50 constrained to the sliding portion or leg of one of the telescopic elements, for example the first telescopic element 22.

By actuating the calliper 48 both the sliding portions of the telescopic elements 22 and 24 are made integral with the support assembly 16, consequently preventing the rectilinear movement of the wheel 12 as regards the steering pipe 14. This blocking operation is advantageous during the parking operations of three or four-wheeled motorcycles with low track, since it limits the possibilities for the motorcycles themselves to tip over following rolling movements on the suspensions.

Given that the parallel condition of the telescopic elements 22 and 24 is essential for the correct operation of the suspension system 10, particular care must be taken so that the assembly operations of the system 10 itself do not introduce flexing stresses on the relative components. According to what is shown in FIG. 2, as a first assembly operation a peg 52 is inserted, which has been calibrated with millesimal tolerance, at least in the pair of connection holes 26A arranged farthest down on the two telescopic elements 22 and 24. The internal diameter of each of such lower connection holes 26A is substantially the same size as the external diameter of each peg 52 (h6/G5 coupling according to the ISO system), whereas the peg 52 itself is axially provided with a through hole for the introduction of the screw 42A.

Once the pair of lower connection holes 26A of the telescopic elements 22 and 24 have been brought together, without forcing, through the screw 42A and the relative nut 54A, the only degree of freedom of the system 10 will be the relative angle between the axes of the telescopic elements 22 and 24 themselves. This indetermination is eliminated by inserting the rods of the telescopic elements 22 and 24 inside clamps 18 and 20 obtained on the support assembly 16. Only at this point the clamps 18 and 20 are clamped and, thereafter, the blocking torque foreseen for the screws 42B and 42C and the relative nuts 54B and 54C of the remaining pairs of connection holes 26B and 26C of the telescopic elements 22 and 24 is applied.

The remaining pairs of holes 26B and 26C that connect together the telescopic elements 22 and 24 do not perform a centring function, preferably having a greater internal diameter than the external diameter of the respective screws 42B and 42C that engage them, so as to avoid further positional constraints for the telescopic elements 22 and 24 themselves. Intermediate pegs are not therefore foreseen between such pairs of holes 26B and 26C and the respective screws 42B and 42C.

In order to ensure a stable coupling between the two telescopic elements 22 and 24 it is finally possible to foresee, at least for the pair of lower connection holes 26A provided with peg 52, one or more safety toothed washers 56A. Such safety toothed washers 56A avoid the accidental unscrewing, for example after intense and prolonged use of the suspension system 10, of the screw 42A from the relative nut 54A.

Figure 6:
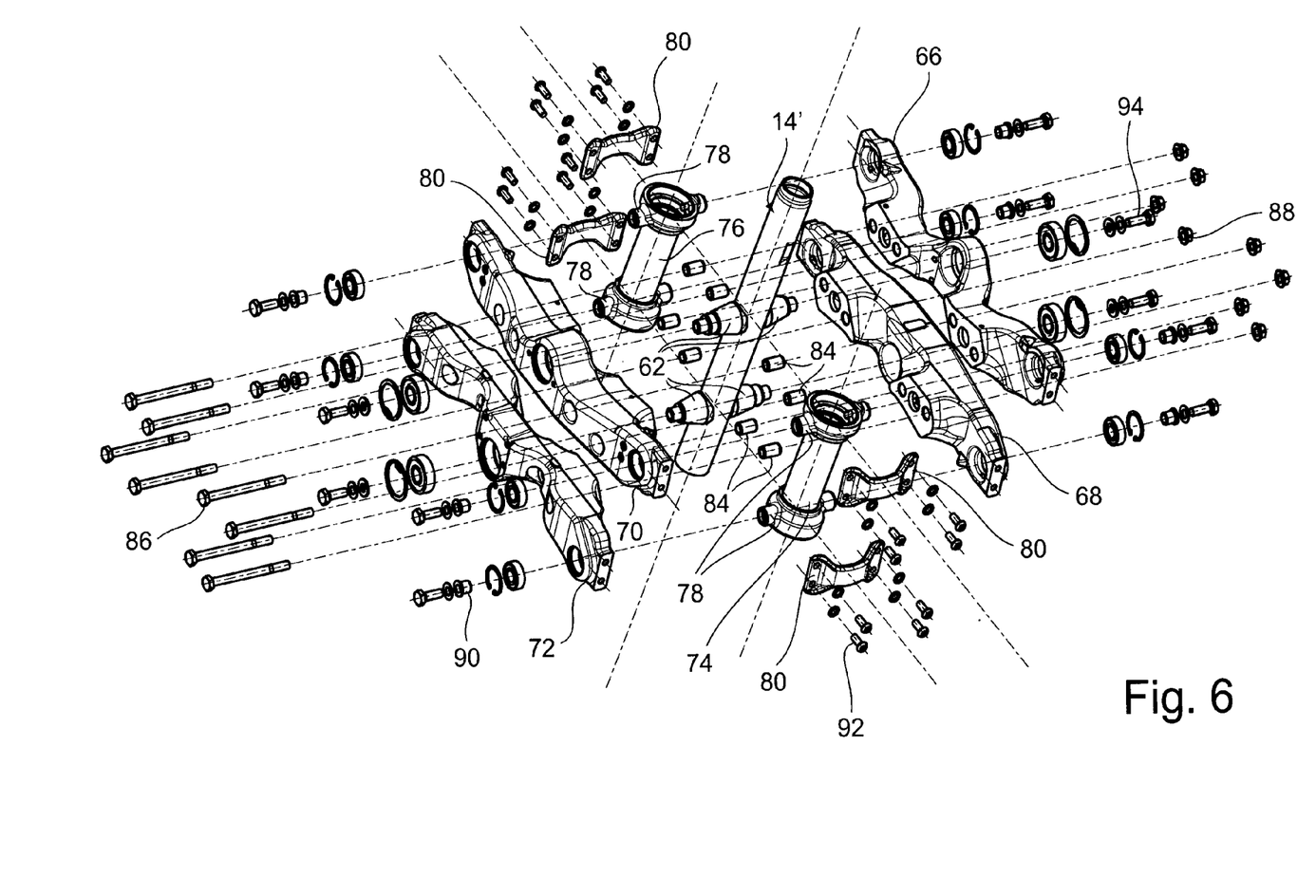
FIG. 6 is an exploded view of the front tilting mechanism of the motorcycle of FIG. 1, in which the central steering pipe of the frame, the double transversal guiding arms for the rolling movement, the lateral steering posts and the various joints and connection screws are highlighted.

FIG. 6 shows the additional elements necessary to make, together with the suspension system 10 illustrated earlier, the steering group of a tilting motorcycle 100 with two front steering wheels 12. In particular, the four central support ridges 62 are highlighted welded to the central steering pipe 14', two in front position and two in rear position, which are used as supports for the central rolling bearings 64 (illustrated in FIG. 8).

Figure 8:
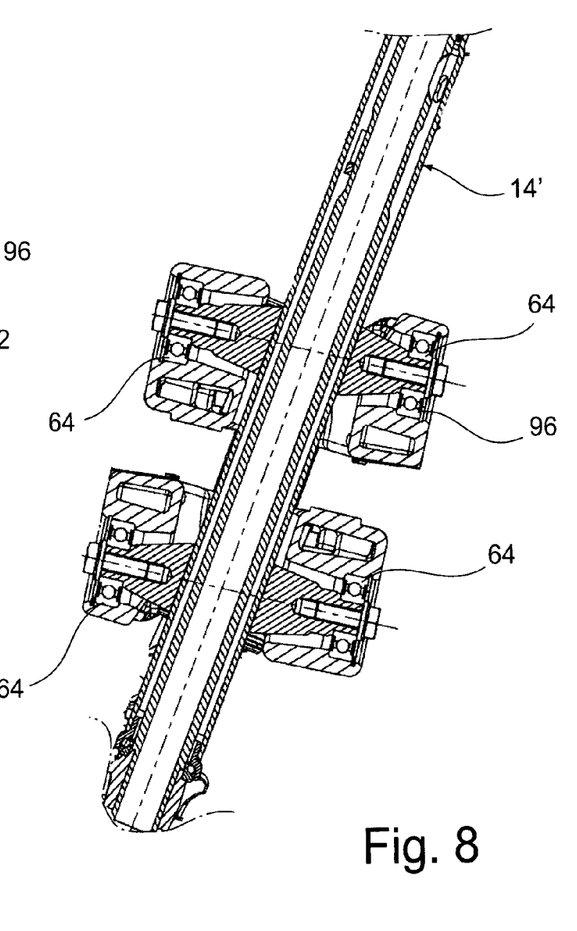
FIG. 8 is a section view illustrating, for the front tilting mechanism of a motorcycle like that of FIG. 1, the detail of the relative inclination of the central pipe of the frame and of the rotation axes of the double transversal guiding arms for the rolling movement.

The outer rings of the central rolling bearings 64 are housed inside special housings made on the two pairs of transversal arms—upper front 66, lower front 68, upper rear 70 and lower rear 72—arranged inverted at the opposite sides of the central steering pipe 14', which form the steering group of the tilting motorcycle 100 and that are centrally and rotatably supported on the four central support ridges 62 welded to the central steering pipe 14'. The upper front transversal arm 66 has an identical shape to that of the lower rear transversal arm 72, whereas the lower front transversal arm 68 has an identical shape to that of the upper rear transversal arm 70.

The transversal arms—upper front 66, lower front 68, upper rear 70 and lower rear 72 are laterally connected through two lateral posts 74 and 76. The two lateral posts 74 and 76 each have four lateral support ridges 78, inside which four respective spacers 90 are inserted, to laterally and rotatably support the two pairs of transversal arms—upper front 66, lower front 68, upper rear 70 and lower rear 72. The axes of the lateral support ridges 78 have the same inclination, as regards the axes of the lateral posts 74 and 76, as the axes of the central support ridges 62 welded to the central steering pipe 14' (as regards the axis of such a central steering pipe 14'). The axes of the central support ridges 62 and the axes of the lateral support ridges 78 are thus inclined as regards the axis of the central steering pipe 14' and as regards the axes of the two lateral posts 74 and 76 according to an angle of between 80° and 120°.

Figure 7:
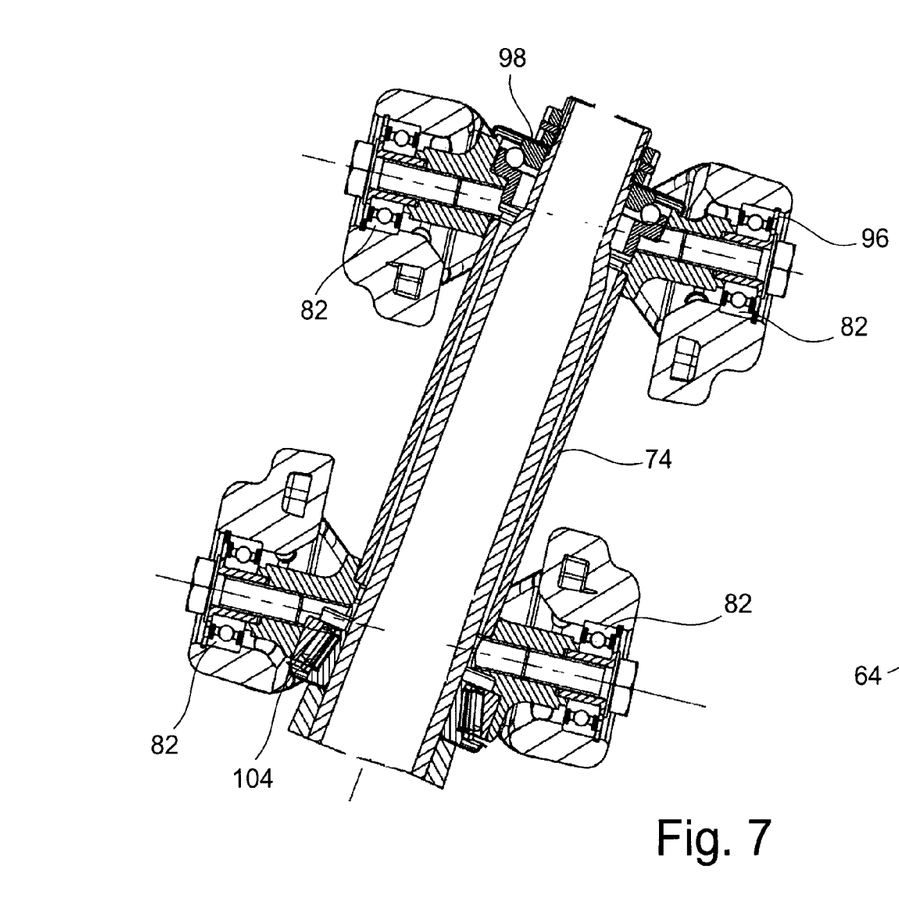
FIG. 7 is a section view illustrating, for the front tilting mechanism of a motorcycle like that of FIG. 1, the assembly of the lateral components.

On the spacers 90 press the outer rings of the lateral rolling bearings 82 (FIG. 7). Similarly to the outer rings of the central rolling bearings 64, the outer rings of the lateral rolling bearings 82 are also housed inside special lateral housings made on the two pairs of transversal rolling arms 66, 68, 70 and 72.

The relative alignment of the components of the steering group of the tilting motorcycle 100 is ensured by eight pegs 84, calibrated with millesimal tolerance, which insert in the same number of holes made in the two pairs of transversal rolling arms 66, 68, 70 and 72 and having the same size of the external diameter of each peg 84 (h6/G5 coupling according to the ISO system).

Figure 15:
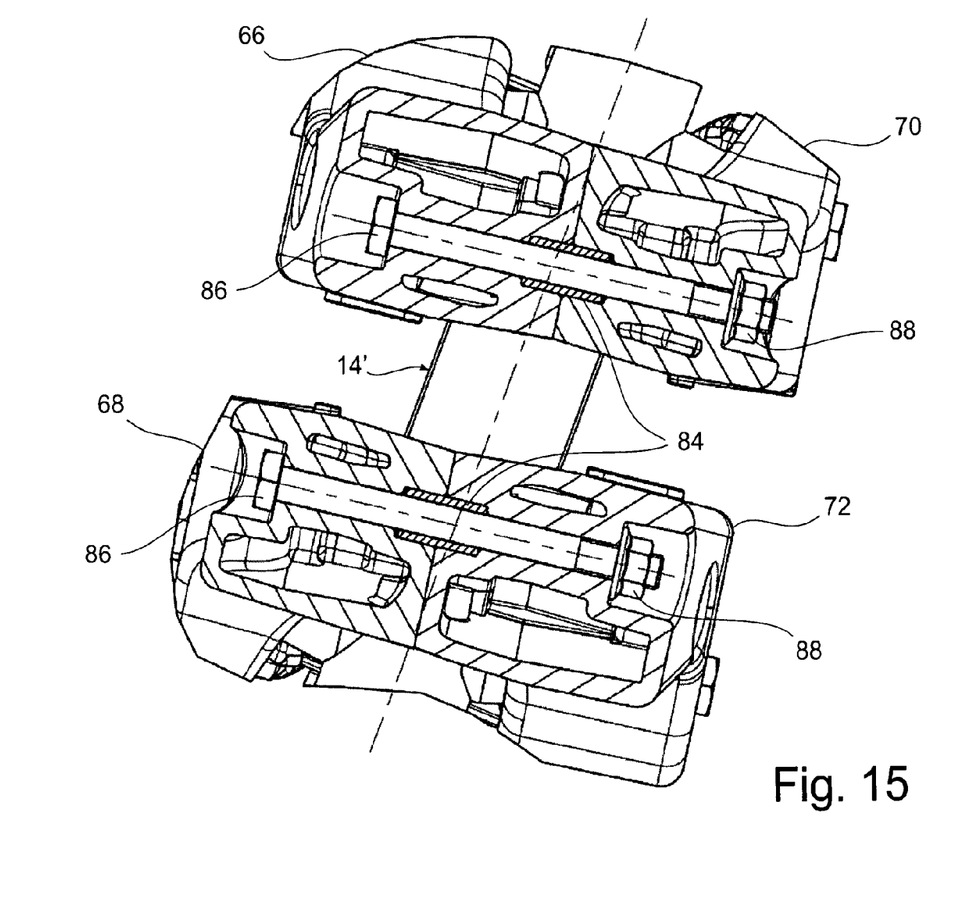
FIG. 15 is a section view showing the assembly of the reference pegs inserted in the transversal guiding arms and the connection screws, coaxial to such pegs, which join the front and rear guiding arms.

The coupling of the components described up to now is completed through eight connection screws 86 and corresponding bolts 88 that make the front and rear portions of the two pairs of transversal rolling arms 66, 68, 70 and 72 integral. The holes of the connection screws 86 are coaxial to the holes of the pegs 84, as indicated in the detail of FIG. 15.

Since for assembly requirements, as well as for simplicity of technological manufacturing, the lateral ends of the two pairs of transversal rolling arms 66, 68, 70 and 72 are "open", the necessary rigidity values of the front axle are achieved through four reinforcement plates 80 made integral with such transversal rolling arms 66, 68, 70 and 72 through screws 92 that engage in the threadings made on the lateral surfaces of the latter.

Finally, a plurality of screws 94 engages in as many threadings made on the central support ridges 62 welded to the central steering pipe 14' and on the lateral support ridges 78 of the lateral posts 74 and 76 to carry out the axial blocking of the inner rings of the central rolling bearings 64 on the central support ridges 62 of the central steering pipe 14'. The sliding of the outer rings of the central and lateral rolling bearings 64 and 82 as regards the housings obtained on the transversal rolling arms 66, 68, 70 and 72 is further limited, for safety reasons, by six Seeger rings 96 (FIGS. 7 and 8).

In particular, the insertion of the spacers 90 with a certain tolerance or "clearance" as regards the housings obtained on the lateral support ridges 78 of the lateral posts 74 and 76 makes it possible to recover possible small positional errors between the axes of the housings of the lateral support ridges 78 themselves, as well as substantially facilitating the assembly operations, given that such spacers 90 make it possible to carry out in sequence the alignments of the right and left portions of the transversal rolling arms 66, 68, 70 and 72 as regards the lateral posts 74 and 76. The arrangement of the described elements makes it possible to make an articulated quadrilateral having high flexional and torsional rigidity, the rotation of which is free as regards the central steering pipe 14' and, therefore, as regards the frame 102 of the motorcycle 100 to which such a central steering pipe 14' is connected.

The insertion of the suspensions 10, as shown for example in FIG. 2, articulated through fifth wheels 98 and conical roller bearings 104 inside the lateral posts 74 and 76 (FIG. 7) makes a system with two tilting and steering front wheels that are easy to install, thanks to the breaking down into two parts, front and rear, of the transversal rolling arms 66, 68, 70 and 72, as well as having high rigidity, ensured by the connection of the front and rear portions of the steering group through numerous joining elements arranged along the entire transversal extension of the structure (pegs 84, screws 86 and 92, reinforcement plates 80).

A further special feature of the suspension system 10, able to be seen in FIGS. 7 and 8, is the specific inclination of the axes of the central support ridges 62 as regards the axis of the central steering pipe 14' that, as mentioned earlier, is identical to the inclination of the lateral support ridges 78 as regards the axes of the lateral posts 74 and 76. This means that there is no parallel condition between the central steering pipe 14' and the two fixed portions or rods of the telescopic elements 22 and 24 or, in other words, the fact that such two fixed portions or rods of the telescopic elements 22 and 24 are inclined according to an angle of between 80° and 120° as regards the central steering pipe 14'. Such an inclination makes it possible to make the rotation axes of the central and lateral rolling bearings 64 and 82 (parallel to those of the aforementioned ridges) parallel to the ground in maximum braking conditions.

The innovative configuration described up to now ensures that the caster trail exerted by the tyres of the front steering wheels 12 have zero lever arm as regards the rotation of the articulated quadrilateral made by the transversal rolling arms 66, 68, 70 and 72 and by the lateral posts 74 and 76 inside which the two fixed portions or rods of the telescopic elements 22 and 24 (symmetrical right and left) are inserted. In the suspension systems according to the prior art, as for example in documents U.S. Pat. No. 2,953,395 and DE 808191 C, the axis of the suspension arms is, on the other hand, parallel to the axis of the steering pipe. Only in this way does a possible unbalancing of the braking forces between right and left tyre of the front wheels 12, for example due to blocking of just one of such wheels, not induce rotation torques on the rolling articulated quadrilateral, cancelling out the possibility of triggering potentially harmful vibrations for the driving of the motorcycle 100.

Figure 1B:
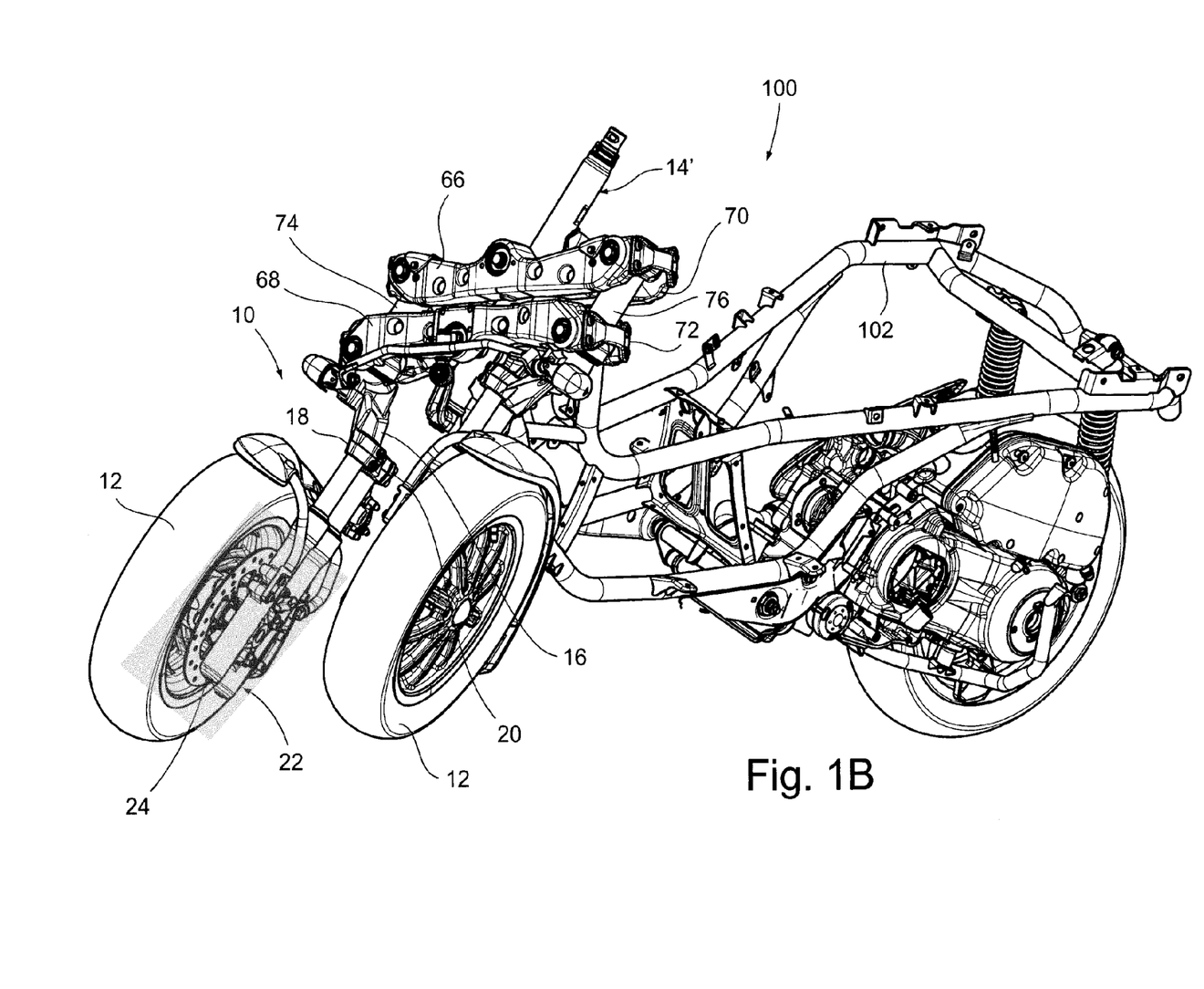
FIG. 1B is another perspective view showing the frame and the engine unit of a tilting three-wheeled motorcycle, illustrated in inclined position, with 30° rolling angle and 20° steering angle, to which a suspension system according to the invention is applied.
Figure 9:
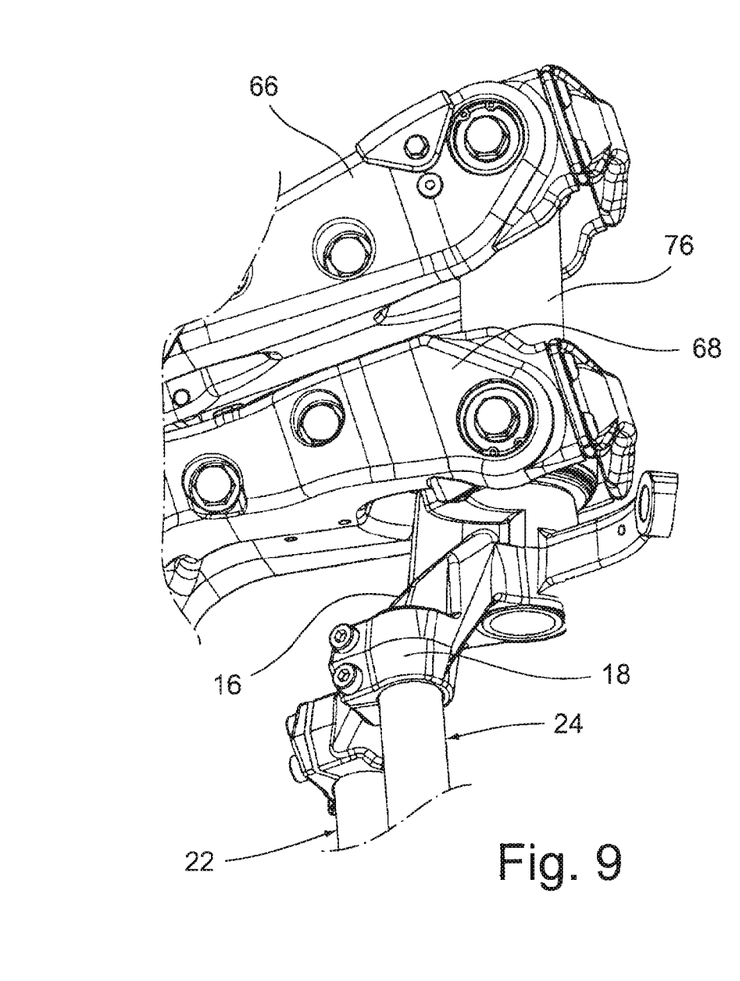
FIGS. 9 and 10 show, free steering and limited steering condition respectively, the detail of the lateral steering posts, of the transversal rolling arms and of the suspensions of a motorcycle like the one of FIG. 1, with particular reference to the steering limitation system depending on the angle of inclination of the rolling arms.
Figure 10:
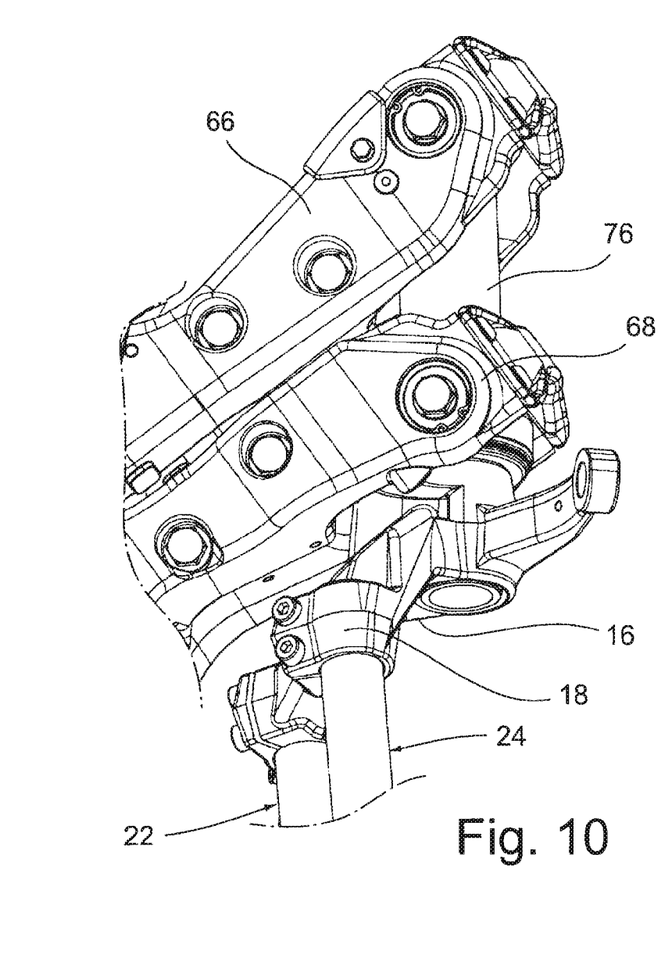
Figure 11:
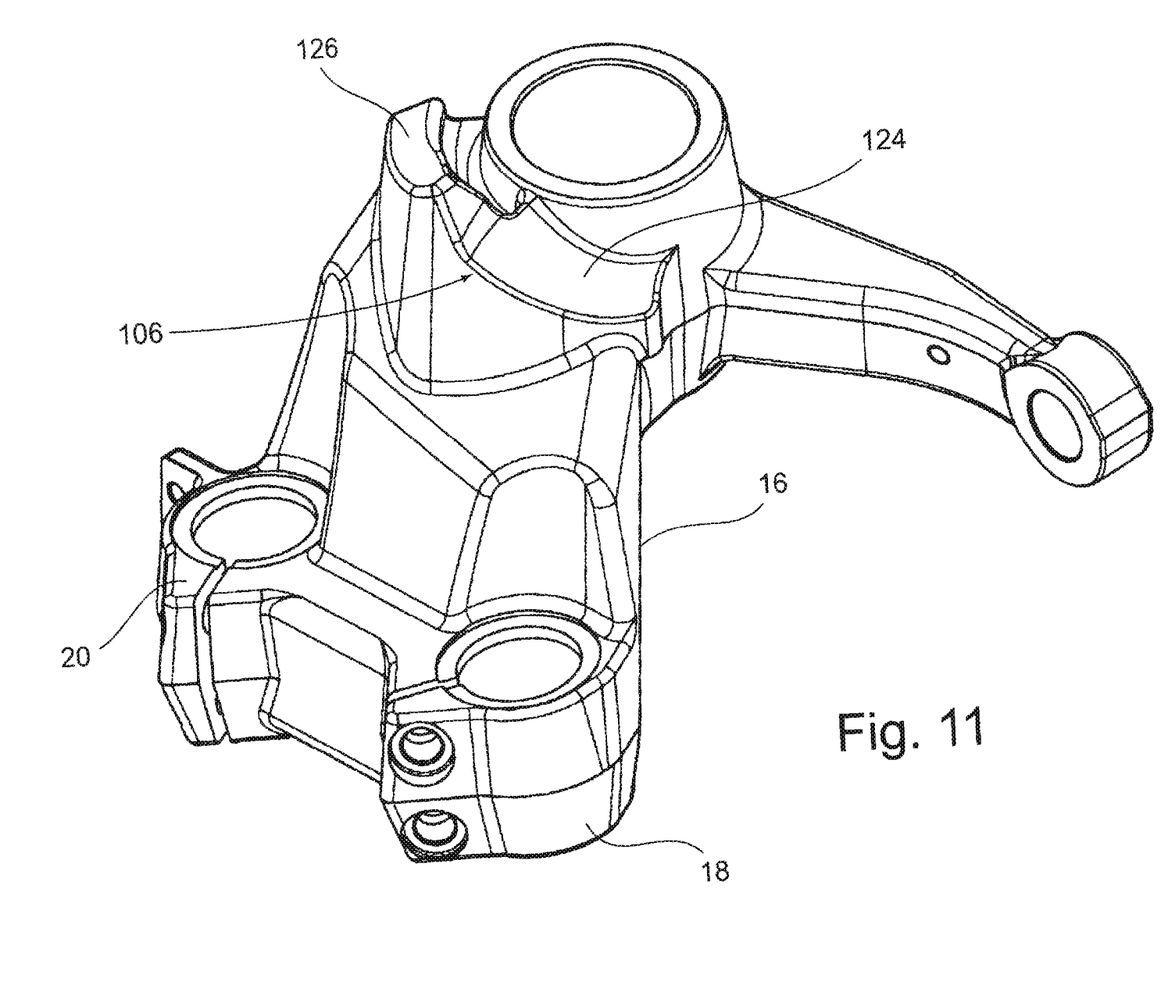
FIG. 11 shows the surfaces suitable for limiting the steering obtained on the supporting assemblies of the suspensions.
Figure 12:
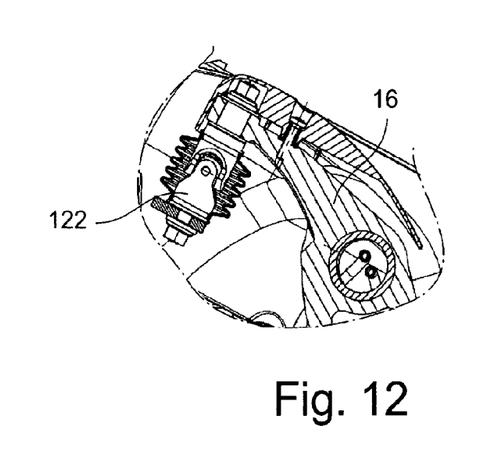
FIG. 12 is a section view showing a detail of the connection of the cardan joints to the steering bar and to the suspension supports.

As shown in FIG. 1B, the linkage of the steering group of the tilting motorcycle 100 with two front steering wheels 12 causes, as the roll angle increases, a great reduction in the distance between the two front wheels 12 and the frame 102. Therefore, as illustrated in FIGS. 9 and 10, it is advantageous to limit the possibility of steering depending on the angle of inclination of the motorcycle 100 to avoid possible interference between the components of the steering group. In order to obtain the described result, on the lower transversal rolling arms 68 and 72 two symmetrical cams, right and left, are made that are suitably sized, which press on the shaped profiles 106 obtained on the supporting assemblies 16. As is clear from the comparison between FIG. 9 (system represented in free steering conditions) and FIG. 10 (system represented in limited steering conditions), by varying the shape of the profiles 106 and, consequently, of the cams, it is possible to impose to desired maximum steering law depending on the roll angle of the motorcycle 100. As can be worked out from the detail of FIG. 12, the profiles 106 have two clearly distinct sections 124 and 126 that allow both the steering step in the direction of travel of the corner (front section 124), and a possible counter-steering manoeuvre, to be limited.

Figure 13:
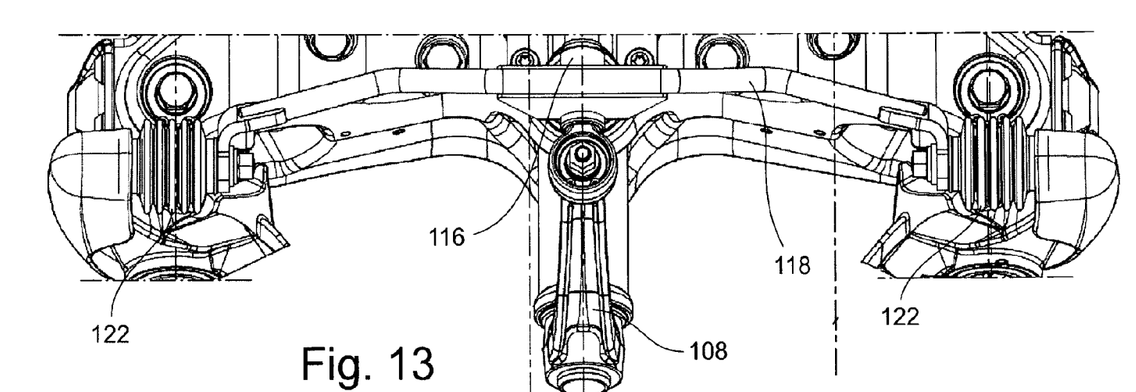
FIG. 13 is a front view of the steering system of a motorcycle like the one of FIG. 1, in which it is possible to see the main steering bar, the control rod, the transmission element, articulated as regards such a control rod through ball bearing, and the two lateral cardan joints.
Figure 14:
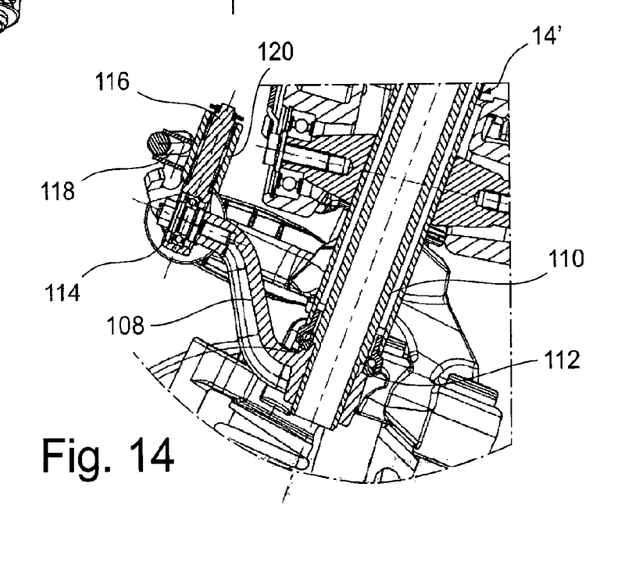
FIG. 14 is a section view showing the steering system, in which the main steering axle, the lower fifth wheel, the control bar, the transmission element, the ball bearing that allows the rotation of the transmission element as regards the control bar and the needle bearings between the transmission element and the steering bar are highlighted.

FIGS. 13 and 14 show the steering system of the two telescopic elements 22 and 24, connected to the right and left sides of the motorcycle 100, of the suspension system 10, highlighting the control rod 108 screwed onto the steering axle 110 (to clamp the lower fifth wheel 112), in turn inserted inside the steering pipe 14. On the control rod 108 rests the inner ring of a ball bearing 114, whereas the outer ring of the ball bearing 114 is inserted in a transmission element 116 connected to a steering bar 118. Between the transmission element 116 and the steering bar 118 two needle bearings 120 are interposed. On the ends of the steering bar 118, made through plates bent into an L, two cardan joints 122 (FIG. 12) are constrained. The remaining ends of the cardan joints 122 are, on the other hand, connected to the support elements 16 of the two pairs of telescopic elements 22 and 24, right and left, of the motorcycle 100.

The steering system thus obtained makes it possible to transmit, with a 1:1 ratio, the rotation imparted by the steering axle 110 to both of the pairs of telescopic elements 22 and 24, right and left, in all roll conditions of the motorcycle 100. In fact, the system of constraints used is the kinematic equivalent to three ball joints applied respectively between the steering bar 118 and the control rod 108 and between the steering bar 118 and the supports 16 of the telescopic elements 22 and 24. As regards a conventional system made through ball joint heads, the assembly described makes it possible to achieve high fields of rotation to support roll and steering angles both greater than 40°. Moreover, the friction of first detachment, always present in ball joint heads, which would make the motorcycle 100 difficult to drive at low speed, is minimized.

It has thus been seen that the steering suspension system with cantilevered wheel for motorcycles according to the present invention achieves the purposes highlighted earlier.

The steering suspension system with cantilevered wheel for motorcycles of the present invention thus conceived can in any case undergo numerous modifications and variants, all of which are covered in the same inventive concept; moreover, all of the details can be replaced with technically equivalent elements. In practice, the materials used, as well as the shapes and sizes, can be whatever according to the technical requirements.

The scope of protection of the invention is therefore defined by the attached claims.

What is claimed is:
1. A motorcycle comprising a frame, two front steering wheels, a steering pipe rotatably connected to the frame and rigidly connected to two supporting assemblies, one for each front steering wheel, each supporting assembly being constrained by fixed portions or rods of two telescopic elements, and a steering group comprising two pairs of transversal arms—upper front, lower front, upper rear and lower rear—arranged inverted at the opposite sides of a central steering pipe and laterally connected through two lateral posts, wherein each pair of telescopic elements is cantilever-mounted to its corresponding steering wheel, sliding portions or legs of each pair of telescopic elements being constrained to each other and arranged parallel to each other so as to make both telescopic elements of each pair lie on a plane parallel to the plane of the relative steering wheel, each telescopic element being internally provided with an elastic element and an oscillation damping element in order to provide the motorcycle suspension, said constraint between the sliding portions of the telescopic elements hindering the relative rotation of said sliding portions around their own axis in order to control the steering angle of each wheel with respect to the frame depending on the rotation imparted to the central steering pipe,
wherein said steering group further comprises a control rod screwed onto a steering axle, in turn inserted inside said central steering pipe and wherein on the control rod there rests an inner ring of a ball bearing, and wherein the outer ring of said ball bearing is inserted in a transmission element connected to a steering bar.

2. The motorcycle of claim 1, wherein on the sliding portion of a first of said telescopic elements of each pair of telescopic elements one or more holes are present which couple with corresponding holes obtained on the sliding portion of the second telescopic element of each pair of telescopic elements, so as to obtain a mutual connection, through fixing elements, of said first and second telescopic elements.

3. The motorcycle of claim 2, wherein said fixing elements comprise a plurality of screws with corresponding nuts.

4. The motorcycle of claim 3, wherein said fixing elements further comprise a peg, inserted in at least a first pair of holes and is axially provided with a through hole for the introduction of the corresponding screw, the internal diameter of the holes of said first pair being substantially equal to the external diameter of said peg.

5. The motorcycle of claim 4, wherein said fixing elements further comprise, at least for said first pair of holes, one or more safety-toothed washers to prevent the accidental unscrewing of the screw from the corresponding nut.

6. The motorcycle of claim 1, wherein the sliding portions of each pair of telescopic elements are manufactured as one piece, on which two cylindrical housings are provided for telescopic coupling with the fixed portions of said pair of telescopic elements.

7. The motorcycle of claim 1, wherein on the sliding portion of the first and/or of the second telescopic element of said pair of telescopic elements are provided a sleeve supporting the pin of the relative steering wheel, one or more housings supporting a brake clip for a brake disk of said steering wheel and one or more housings for the fastening of a mudguard of said steering wheel.

8. The motorcycle of claim 1, wherein the axis defined by the steering pipe is parallel to the axes of said two pairs of telescopic elements.

9. The motorcycle of claim 1, wherein the steering pipe is inclined differently with respect to the axis direction of said two pairs of telescopic elements.

10. The motorcycle of claim 1, further comprising a blocking system that restricts the rectilinear movement of the sliding portion of each telescopic element as regards the relative fixed portion.

11. The motorcycle of claim 10, wherein said blocking system comprises a connection plate constrained to the supporting assembly, on said connection plate being installed a calliper acting on a plate constrained to the sliding portion of one of said telescopic elements, the actuation of said calliper causing both sliding portions of said telescopic elements to be integral with the supporting assembly, so as to prevent rectilinear movement of the steering wheel with respect to the steering pipe.

12. The motorcycle of claim 1, wherein the central steering pipe is provided with four central support ridges that centrally and rotatably support the two pairs of transversal arms—upper front, lower front, upper rear and lower rear.

13. The motorcycle of claim 12, wherein the axes of lateral support ridges have the same inclination, with respect to the axes of the two lateral posts, and the central support ridges, and with respect to the axis of the central steering pipe.

14. The motorcycle of claim 13, wherein the axes of the central support ridges and the axes of the lateral support ridges are inclined with respect to the axis of the central steering pipe and with respect to the axes of the two lateral posts at an angle of between 80° and 120°.

15. The motorcycle of claim 1, wherein the two lateral posts are each provided with four lateral support ridges that laterally and rotatably support the two pairs of transversal arms—upper front, lower front, upper rear and lower rear.

16. The motorcycle of claim 1, wherein on the transversal arms—lower front and lower rear—two symmetrical cams, right and left, are provided, which press on shaped profiles obtained on the supporting assemblies, to limit the possibility of steering depending on the angle of inclination of the motorcycle and to avoid possible interference between the components of the steering group.

17. The motorcycle of claim 1, wherein between the transmission element and the steering bar are interposed two needle bearings and wherein on the ends of said steering bar two cardan joints are constrained, the remaining ends of said two cardan joints being connected to said supporting assemblies.

* * * * *